United States Patent [19]

Gergen et al.

[11] Patent Number: 4,898,914
[45] Date of Patent: Feb. 6, 1990

[54] MODIFIED BLOCK COPOLYMERS FUNCTIONALIZED IN THE MONOALKENYL AROMATIC OR VINYLARENE BLOCK

[75] Inventors: William P. Gergen, Houston; Robert G. Lutz, Spring, both of Tex.

[73] Assignee: Shell Oil Company, Houston, Tex.

[21] Appl. No.: 194,670

[22] Filed: May 16, 1988

Related U.S. Application Data

[62] Division of Ser. No. 766,217, Aug. 16, 1985.

[51] Int. Cl.[4] ............................................. C08L 53/02
[52] U.S. Cl. ..................................... 525/314; 525/385
[58] Field of Search ................................ 525/385, 314

[56] References Cited

U.S. PATENT DOCUMENTS

| Re. 27,145 | 6/1971 | Jones | 260/880 |
|---|---|---|---|
| 3,109,871 | 11/1963 | Zelinski et al. | |
| 3,135,716 | 6/1964 | Uraneck et al. | |
| 3,175,997 | 3/1965 | Hsieh | |
| 3,251,905 | 5/1966 | Zelinski | 260/879 |
| 3,265,765 | 8/1966 | Holden et al. | 260/876 |
| 3,390,207 | 6/1968 | Moss et al. | 260/879 |
| 3,598,887 | 8/1971 | Darcy et al. | 260/879 |
| 3,639,517 | 2/1972 | Kitchen | 260/879 |
| 3,639,521 | 2/1972 | Hsieh | 260/880 |
| 3,700,633 | 10/1972 | Wald et al. | |
| 3,976,628 | 8/1976 | Halasa | |
| 4,033,888 | 7/1977 | Kiovsky | |
| 4,145,298 | 3/1979 | Trepka | 252/51.5 A |
| 4,208,356 | 6/1980 | Fukawa et al. | 525/89 |
| 4,219,627 | 8/1980 | Halasa et al. | 525/89 |
| 4,292,414 | 9/1981 | Saito et al. | 525/255 |
| 4,308,353 | 12/1981 | Saito et al. | 525/74 |
| 4,409,357 | 10/1983 | Milkovich | |
| 4,427,828 | 1/1984 | Hergenrother et al. | 525/66 |
| 4,471,099 | 9/1984 | Trepka | |

FOREIGN PATENT DOCUMENTS

| 662770 | 10/1965 | Belgium. |
|---|---|---|
| 0103148 | 3/1984 | European Pat. Off.. |

OTHER PUBLICATIONS

B. C. Trivedi, B. M. Culbertson, Maleic Anhydride (Plenum Press, New York, 1982) pp. 172-173.

*Primary Examiner*—Wilbert J. Briggs, Sr.

[57] ABSTRACT

The present invention relates to a thermally stable modified selectively hydrogenated high 1,2 content block copolymer wherein a functional group is grafted to the block copolymer in the vinylarene block.

12 Claims, No Drawings

MODIFIED BLOCK COPOLYMERS FUNCTIONALIZED IN THE MONOALKENYL AROMATIC OR VINYLARENE BLOCK

This application is a division of U.S. application Ser. No. 766,217, filed Aug. 16, 1985.

This invention relates to novel selectively hydrogenated functionalized block copolymers. More particularly, it relates to a modified thermoplastic polymer with excellent appearance properties and mechanical properties particularly useful in blending with other polymers obtained by modifying a block copolymer composed of a conjugated diene compound and an aromatic vinyl compound with a functional group grafted primarily in the vinylarene block.

BACKGROUND OF THE INVENTION

This application is related to application Ser. No. 766,622, filed Aug. 19, 1985, now abandoned which has been filed concurrently herewith.

It is known that a block copolymer can be obtained by an anionic copolymerization of a conjugated diene compound and an aromatic vinyl compound by using an organic alkali metal initiator. These types of block copolymers are diversified in characteristics, depending on the content of the aromatic vinyl compound.

When the content of the aromatic vinyl compound is small, the produced block copolymer is a so-called thermoplastic rubber. It is a very useful polymer which shows rubber elasticity in the unvulcanized state and is applicable for various uses such as moldings of shoe sole, etc.; impact modifier for polystyrene resins; adhesive; binder; etc.

The block copolymers with a high aromatic vinyl compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

The elastomeric properties of certain aromatic vinyl polymers also appear to be due in part to their degree of branching. While the aromatic vinyl polymers have a basic straight carbon chain backbone, those with elastomeric properties always have pendant alkyl radicals. For example, EPR (ethylene-propylene rubber) has a structure of pendant methyl radicals which appear to provide elasticity and other elastomeric properties. When an essentially unbranched straight chain polymer is formed, such as some polyethylenes, the resulting polymer is essentially non-elastomeric or in the other words relatively rigid, and behaves like a typical thermoplastic without possessing rubber-like resilience or high elongation, tensile strength without yield, low set or other properties characteristic of desirable elastomers.

Block copolymers have been produced, see U.S. Pat. Re. No. 27,145 which comprise primarily those having a general structure

A—B—A wherein the two terminal polymer blocks A comprise thermoplastic polymer blocks of vinylarenes such as polystyrene, while block B is a polymer block of a selectively hydrogenated conjugated diene. The proportion of the thermoplastic terminal blocks to the center elastomeric polymer block and the relative molecular weights of each of these blocks is balanced to obtain a rubber having an optimum combination of properties such that it behaves as a vulcanized rubber without requiring the actual step of vulcanization. Moreover, these block copolymers can be designed not only with this important advantage but also so as to be handled in thermoplastic forming equipment and are soluble in a variety of relatively low cost solvents.

While these block copolymers have a number of outstanding technical advantages, one of their principal limitations lies in their sensitivity to oxidation. This was due to their unsaturated character which can be minimized by hydrogenating the copolymer, especially in the center section comprising the polymeric diene block. Hydrogenation may be effected selectively as disclosed in U.S. Pat. Re. No. 27,145. These polymers are hydrogenated block copolymers having a configuration, prior to hydrogenation, of A—B—A wherein each of the A's is an alkenyl-substituted aromatic hydrocarbon polymer block and B is a butadiene polymer block wherein 35–55 mol percent of the condensed butadiene units in the butadiene polymer block have 1, 2 configuration.

These selectively hydrogenated ABA block copolymers are deficient in many applications in which adhesion is required due to their hydrocarbon nature. Examples include the toughening and compatibilization of polar polymers such as the engineering thermoplastics, the adhesion to high energy substrates of hydrogenated block copolymer elastomer based adhesives, sealants and coatings, and the use of hydrogenated elastomer in reinforced polymer systems. However, the placement onto the block copolymer of functional groups which can provide interations not possible with hydrocarbon polymers solves the adhesion problem and extends the range of applicability of this material.

Beyond the very dramatic improvement in interface adhesion in polymer blends, a functionalized S—EB—S component can also contribute substantially to the external adhesion characteristics often needed in polymer systems. These include adhesion to fibers and fillers which reinforce the polymer system; adhesion to substrates in adhesives, sealants, and coatings based on functionalized S—EB—S polymers, adhesion of decorations such as printing inks, paints, primers, and metals of systems based on S—EB—S polymers; participation in chemical reactions such as binding proteins such as heparin for blood compatibility; surfactants in polar-nonpolar aqueous or non-aqueous dispersions.

Functionalized S—EB—S polymer can be described as basically commercially produced S—EB—S polymers which are produced by hydrogenation of S—B—S polymer to which is chemically attached to either the styrene or the ethylene-butylene block, chemically functional moieties.

Many attempts have been made for the purpose of improving adhesiveness, green strength and other properties by functionalizing block copolymers, and various methods have been proposed for functionalizing synthetic conjugated diene rubbers.

Saito et al. in U.S. Pat. No. 4,292,414 and U.S. Pat. No. 4,308,353 describe a monovinyl aryl/conjugated diene block copolymer with low 1, 2 content grated with a maleic acid compound. However, the process is limited to reaction conditions wherein the generation of free radicals is substantially inhibited by using free radical inhibitors or conventional stabilizers for example phenol type phosphorous type or amine type stabilizers. The processes are limited to thermal addition reactions or the so-called "ENE" reaction. This reaction scheme depends on unsaturation in the base polymer for reaction sites. A reasonable amount of residual unsaturation must be present in order to obtain an advantageous degree of functionality or grafting onto the base polymer. A substantially completely hydrogenated base polymer would not react appreciably in the Saito et al. process.

Hergenrother et al. in U.S. Pat. No. 4,427,828 describe a similar modified block copolymer with high 1, 2 content however, again produced by the 'ENE' reaction.

'ENE' process as described in the prior art results in a modified polymer product which is substituted at a position on the polymer backbone which is allylic to the double bond. The reaction can be shown for maleic anhydride as follows:

(a) to main chain unsaturation

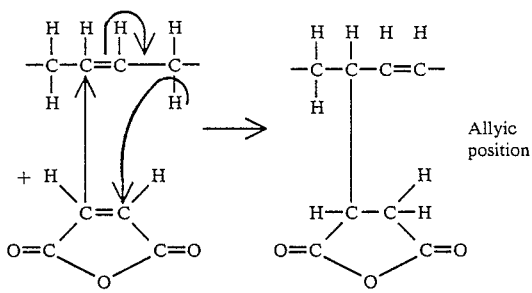

(b) to vinyl saturation

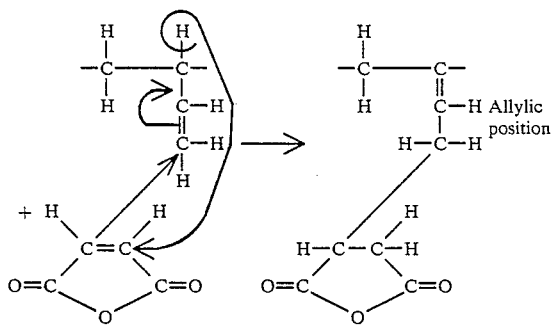

wherein (a) represents addition across a double bond in the main chain of the base polymer and (b) represents addition across a double bond occurring in a side chain. After addition and isomerization the substitution is positioned on a carbon allylic to the double bond.

The allylically substituted polymers are prone to thermal degradation due to their thermal instability. It is known in the art that allylic substitutents can undergo what has been referred to as a retro-ENE reaction, see B. C. Trivedi, B. M. Culbertson, *Maleic Anhydride*, (Plenum Press, New York, 1982) pp. 172–173.

Further, because the ENE reaction requires a reasonable amount of unsaturation in the precursor base polymer, as discussed previously, the resulting functionalized copolymer product will have a significant amount of residual unsaturation and will be inherently unstable to oxidation.

SUMMARY OF THE INVENTION

According to the present invention, there is provided a thermally stable modified selectively hydrogenated high 1, 2 content block copolymer to which a functional group has been grafted primarily in the vinylarene block.

More specifically there is provided a functionalized selectively hydrogenated block copolymer of the formula $B_n(AB)_oA_p$ where $n=0, 1$, $o=1, 2 \ldots$; $p=0, 1$ to which has been grafted at least one electrophilic graftable molecule or electrophile wherein substantially all of said graftable molecules are grafted to the block copolymer in the vinylarene block.

More preferably there is provided a functionalized selectively hydrogenated block copolymer of the formula $B_n(AB)_oA_p$ where $n=0, 1$, $o=1, 2 \ldots$; $p=0, 1$ to which has been grafted an electrophilic graftable molecule or electrophile wherein (1) each A is predominantly a polymerized monoalkenyl aromatic hydrocarbon block having an average molecular weight of about 1,000 to 115,000;

(2) each B prior to hydrogenation is predominantly a polymerized conjugated diene hydrocarbon block having an average molecular weight of about 20,000 to 450,000;

(3) the blocks A constituting 1–95 weight percent of the copolymer;

(4) the unsaturation of the block B is less than 10% of the original unsaturation;

(5) the unsaturation of the A blocks is above 50% of the original unsaturation;

(6) the grafted molecule contains functional groups;

(7) and substantially all of the grafted molecules are grafted to the block copolymer in the vinylarene block.

The feature of this invention lies in providing modified block copolymers which are thermally stable; have a low residual unsaturation, are excellent in appearance characteristics, melt-flow characteristics, and mechanical properties such as tensile strength and impact resistance; etc.

The modified block copolymers according to the present invention are substituted in the vinylarene block as shown in the exemplary reactions given below:

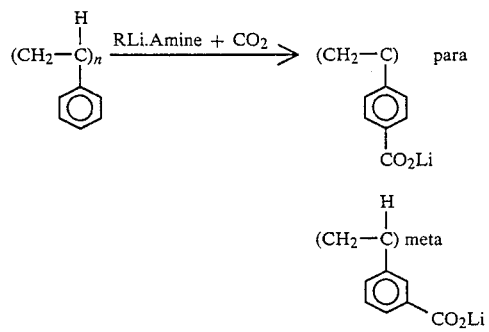

Here: RLi=Alkyl Lithium

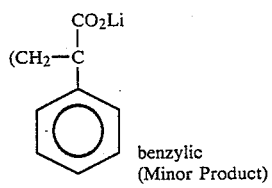
benzylic
(Minor Product)

The structure of the substituted block copolymer specifically determined by the location of the functionality on the polymer backbone in the vinylarene block gives the block copolymer a substantially greater degree of thermal stability.

DETAILED DESCRIPTION OF THE INVENTION

Selectively Hydrogenated Block Copolymer Base Polymer

Block copolymers of cojugated dienes and vinyl aromatic hydrocarbons which may be utilized any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including these containing up to about 60 percent by weight of vinyl aromatic hydrocarbon. Thus, multiblock copolymers may be utilized which are linear or radial symetric or asymetric and which have structures represented by the formulae A—B, A—B—A, A—B—A—B, B—A, B—A—B, B—A—B—A, $(AB)_{0, 1, 2}$... BA and the like wherein A is a polymer block of a vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

Graftable Compounds

In general, any materials having the ability of react with the lithiated base polymer, are operable for the purposes of this invention.

In order to incorporate functional groups into the base polymer, monomers capable of reacting with the base polymer are necessary. Monomers may be polymerizable or nonpolymerizable, however, preferred monomers are nonpolmerizable or slowly polymerizing.

The class of preferred electrophiles which will form graft polymers within the scope of the present invention include reactants from the following groups carbon dioxide, ethylene oxide, aldehydes, ketones, carboxylic acid salts, then esters and halides, epoxides, sulfur, boron alkoxides, isocyanates and various silicon compounds.

These electrophiles may contain appended functional groups as in the case of N,N-dimethyl-p-amino benzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxylate functional group. By these routes, polymers could be prepared containing grafted sites selected from one or more of the following groups of functionality type carboxylic acids, their salts and esters, ketones, alcohols and alkoxides, amines, amides, thiols, borates, and functional groups containing a silicon atom.

These functionalities can be subsequently reacted with other modifying materials to produce new functional groups. For example, the grafted carboxylic acid described above could be suitably modified by esterifying the resulting acid groups in the graft by appropriate reaction with hydroxycontaining compounds of varying carbon atoms lengths. In some cases, the reaction could take place simultaneously with the grafting process but in most examples it would be practiced in subsequent post modification reaction.

The grafted polymer will usually contain from 0.02 to 20, preferably 0.1 to 10, and most preferably 0.2 to 5 weight percent of grafted portion.

The block copolymers, as modified, can still be used for any purpose for which an unmodified material (base polymer) was formerly used. That is, they can be used for adhesives and sealants, or compounded and extruded and molded in any convenient manner.

Preparation of the Polymers

The polymers may be prepared by any convenient manner one of which is described in copending U.S. application Ser. No. 766,622, filed Aug. 19, 1985, now abandoned, which is herein incorporated by reference.

An example of a method to incorporate functional groups into the base polymer primarily in the vinylarene block is metalation.

Metalation is carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated polymer. In the compounds represented by $R'(Li)_x$, the R' is usually a saturated hydrocarbon radical of any length whatsoever, but ordinarily containing up to 20 carbon atoms, and can be aromatic radical such as phenyl, naphthyl, tolyl, 2-methylnaphthyl, etc., or a saturated cyclic hydrocarbon radical of e.g. 5 to 7 carbon atoms, a monounsaturated cyclic hydrocarbon radical of 5 to 7 carbon atoms, an unconjugated, unsaturated aliphatic hydrocarbon radical of 2 to 20 carbon atoms, or an alkyllithium having one or more aromatic groups on the alkyl group, the alkyl group containing 1 to 20 carbon atoms. In the formula, $R'(Li)_x$ x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated alkyl. Of course, other alkali metal or alkaline earth metal alkyls could be used but the lithium alkyls are preferred due to their ready commercial availability. In a similar way, metal hydrides could be employed as the metalation reagent but the hydrides have only limited solubility in the appropriate solvents. Therefore, the metal alkyls are preferred and their greater solubility which makes them easier to process.

Lithium compounds alone usually metalate copolymers containing aromatic and olefinic functional groups with considerable difficulty and under high temperatures whih may tend to degrade the copolymer. However, in the presence of tertiary diamines and bridgehead monoamines, metalation proceeds rapidly and smoothly. Some lithium compounds can be used alone effectively, notably the methyllithium types.

It has been shown that the metalation occurs at a carbon to which an aromatic group is attached, or in an aromatic group, or in more than one of these positions. In any event, is has been shown that a very large number of lithium atoms are positioned varously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metallation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $(R^2)_2N-C_yH_{2y}-N(R^2)_2$ in which each $R^2$ can be the same or different straight- or branched-chain alkyl group of any chain length containing up straight- or branched-chain alkyl group of any chain length containing up to 20 carbon atoms or more all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexyienediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine, and the like.

Tertiary monoamines such as triethylenediamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

Polar metalation promotors may be present in an amount sufficient to enable metalation to occur, e.g. amounts between 0.01 and 100 or more preferably between 0.1 to about 10 equivalents per equivalent of lithium alkyl.

The equivalents of lithium employed for the desired amount of lithiation generally range from such as about 0.001–3 per vinyl arene unit in the copolymer, presently preferably about 0.01–1.0 equivalents per vinyl arene unit in the copolymer to be modified. The molar ratio of active lithium to the polar promoter can vary from such as 0.01 to 10.0. A preferred ratio is 0.5.

The amount of alkyl lithium employed can be expressed in terms of the Li/vinylarene molar ratio. This ratio may range from a value of 1 (one lithium alkyl per vinylarene unit (to as low as $1 \times 10^{-3}$ (1 lithium alkyl per 1000 vinylarene units).

The process of lithiation can be carried out at temperatures in the range of such as about $-70°$ C. to $+150°$ C., presently preferably in the range of about 25° C. to 60° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally the time can range from a few seconds to about 72 hours, presently preferably from about 1 minute to 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species must contain functional groups capable of undergoing nucleophilic attack by a lithium anion. Such species contain functional groups including but not limited to

| | | | |
|---|---|---|---|
| $-\overset{O}{\underset{\|}{C}}-O-$ | carboxyl | $C-NR_2$ | Amine |
| $C-OH$ | hydroxyl | $\overset{O}{\underset{\|}{C}}-NR_2$ | Amide |
| $C-OR$ | ether | $C-SH$ | Thiol |
| $-\overset{O}{\underset{\|}{C}}-R$ | ketone | $C-B(OR)_2$ | Borane Containing |
| $-\overset{O}{\underset{\|}{C}}-H$ | aldehyde | $\underset{\|}{\overset{\|}{C}}-\underset{\|}{Si}-$ | Silicon Containing |

The process also includes further chemistry on the modified block copolymer. For example, converting of a carboxylic acid salt containing modified block copolymer to the carboxylic acid form can be easily accomplished.

EXAMPLES

Example 1

The base polymer used in the following example was an S-E/B-S type block copolymer (herein referred to as reactant polymer A). Reactant polymer A had a molecular weight of about 50,000 and was 30% polystyrene.

In a typical experiment, 100 lbs of a polymer cement containing Polymer A in cyclohexane (5% solids) was lithiated at 60° C. using a diamine (TMEDA) promoted s-Buli reagent (1.1 mol base, 1.8 mol promoter). A rapid metalation reaction afforded a thixotropic, semisolid cement which immobilized the reactor's stirring mechanism (auger type) within 3-4 minutes. An aliquot of the lithiated-polymer cement was quenched with $D_2O$. The remainder was transferred through a 1½" diameter line to a vessel containing an excess of $CO_2$ (3 lbs) in tetrahydrofuran (THF). The carboxylated product was treated with HOAc (85 g, 1.4 mol) and finished by steam coagulation affording over 4 lbs of white, functionalized polymer crumb. Analyses of the carboxylated product found 0.84% wt—$CO_2H$ and 0.29% wt—$CO_2$—for a total polymer bound carboxylate content of 1.13% wt.

A deuterium (D) NMR analysis of the $D_2O$ treated aliquot found the D resided primarily at aromatic sites, at meta and para positions on the ring, (90% of total D), with the remainder of the tag or label being at either benzylic or allylic positions (10% of total D). The technique cannot discern between allylic and benzylic locations. Thus, the label resided principally, at least 90%, and most likely entirely in the polystyrene block of the polymer. We infer from this labelling experiment that essentially all of the lithiation reaction, at least 90%, occurred in the polystyrene block. Therefore, essentially all of the carboxylation must occur at these sites as well.

For this experiment, 50% of the reactant s-BuLi was converted into polymer bound carboxylate as found in the product (lithiation efficiency). The product, as finished, contained 74 parts of acid (—$CO_2H$) to every 26 parts of salt (—$CO_2$—).

Examples 2-14

Examples 2-14 were conducted as outlined in Example 1. Some modifications were used as outlined in Table 1.

Reactant polymer B was similar to polymer A with the molecular weight being about 67,000. Reactant polymer C was similar to polymer A with the molecular weight being about 181,000 and a polystyrene content of 33%. Reactant polymer D was an S-E/P type of block copolymer with a total molecular weight of about 98,000 and a polystyrene content of 37%.

The lithiation of polymers A, B and C proceeded with a rapid rise in viscosity in all examples. In some examples, the lithiated product was allowed to digest for longer periods without stirring. The lithiation of polymer D proceeded with no observable increase in cement viscosity.

As found in Example 1, deuterium NMR analyses of $D_2O$ quenched aliquots of the various products found the label to be predominantly in the polystyrene block of the polymer. These results are summarized in Table 2.

Each of the deuterated samples was analyzed by Gel Permeation Chromatography. The resulting molecular weight information did not differ significantly from that for the starting unmetalated polymer. This indicates that the metalation technique did not induce any degradation, for example, chain scission or crosslinking in these polymers.

Control experiments using the reaction technique of Example 1 and S-rubber-S block copolymers where the rubber is substantially unsaturated showed that these reactants were lithiated indiscriminately in both the styrene block (about 50%) and the rubber block (about 50%). These randomly functionalized products were not preferred.

TABLE I
PREPARATION OF KRATON® G POLYMER CONTAINING LITHIUM CARBOXYLATE FUNCTIONALITY

| | Reaction Conditions | | | Product Analysis | | | | |
|---|---|---|---|---|---|---|---|---|
| Example | Polymer Type | s-Bu—Li (mol) | Reaction Time (min) | Carboxylate Content (% wt) | | | Lithiation Efficiency % | Acid/Salt As Finished Polymer |
| | | | | Theory | As Finished | Acidified | | |
| 2 | A | 1.13 | 60 | 2.25 | 1.12 | 1.39 | 62 | 81/19 |
| 3 | A | 1.13 | 60 | 2.25 | 0.21 | 0.22 | 10 | 95/5 |
| 4 | A | 1.13 | 60 | 2.25 | 0.60 | 1.04 | 46 | 58/42 |
| 5 | B | 1.13 | 1 | 2.25 | — | 0.94 | 42 | 10/90 |
| 6 | B | 1.13 | 2 | 2.25 | 0.13 | 1.00 | 44 | 13/87 |
| 7 | B | 0.38 | 60 | 0.75 | 0.46 | 0.43 | 58 | 99/1 |
| 8 | B | 0.38 | 60 | 0.75 | 0.28 | 0.27 | 36 | 99/1 |
| 9 | C | 0.38 | 4 | 0.75 | 0.22 | 0.33 | 44 | 67/33 |
| 10 | C | 0.38 | 10 | 0.75 | 0.31 | 0.33 | 46 | 94/6 |
| 11 | D | 1.13 | 60 | 2.25 | 0.92 | 1.15 | 51 | 80/20 |
| 12 | D | 1.13 | 30 | 2.25 | 0.36 | 0.24 | 11 | 99/1 |
| 13 | D | 1.13 | 60 | 2.25 | 1.15 | 1.39 | 62 | 83/17 |
| 14 | B | 0.9 | 150 | — | 0.44 | — | — | — |

TABLE II
Location of Deuterated Site

| Example Number | Location of Deuterium Label (Carboxylate) | |
|---|---|---|
| | Aromatic (%) | Benzylic, Allylic (%) |
| 2 | 91 | 9 |
| 3 | 93 | 7 |
| 4 | 92 | 8 |

EXAMPLE 15

The modified block copolymer in Example 14 was converted to the carboxylic acid salt formed by the following procedure: 50 gms of polymer was dissolved in 500 gms of a 90:10 mixture of cyclohexane:THF. Next, 4.3 gms of a 1 molal aqueous LiOH solution was added. The mixture was allowed to stand 24 hours. The polymer was then recovered by precipitation with methanol and dried under vacuum. By IR analysis, the sample showed complete conversion of acid functionality to lithium salt functionality. The absorbance band of the salt occurs at 1560–1600 cm$^{-1}$, while that of the acid occurs at 1690 cm$^{-1}$.

Example 16

In this example, hydroxyl functionality was placed on the base polymer. The base polymer used was Reactant Polymer B.

100 gms of the base polymer was dissolved in 100 ml of cyclohexane in a glass reactor under an argon purge. 1.02 meq TMEDA per gm of polymer was then added. Impurities in the mixture was then removed by titration with sec-butyllithium. The reactor contents were heated to 50° C., and 0.51 meq of additional sec-butyllithium per gm of polymer were added. 1000 ml of distilled THF was added and this solution was stirred at 25° C. for 16 hours. This mixture was maintained at 40°–45° C. for 70 minutes. Next, ethylene oxide was bubbled into the vessel and the mixture was stirred for 10 minutes at 45° C. Finally, 1 meq of HCl (in methanol) per gm of polymer was added to the reactor. The polymer was recovered by coagulation into isopropanol and washed with methanol. A portion of the polymer was dried under vacuum at 40° C.

In order to analyze this hydroxylated polymer, the OH functionality was converted to acid by reaction with maleic anhydride at 150°–160° C. in diisopropylbenzene. The reaction product was precipitated into methanol and washed with 70° C. water to remove unreacted maleic anhydride. IR measurement showed carbonyl bands at 1730 cm$^{-1}$ characteristic of a maleic ester.

The polymer was then dried under vacuum at 50° C. Titration for the half maleic acid ester using potassium methoxide in methanol together with a phenolphthalein indicator gave 0.18 meq acid per gm polymer, showing that the original modified block copolymer contained 0.18 meq OH groups per gm polymer.

What is claimed is:

1. A functionalized selectively hydrogenated block copolymer of the formula $B_n(AB)_oA_p$ where n=0 or 1, o=1 to 50, p=0 or 1, each A is predominantly a polymerized monoalkenyl aromatic or vinylarene hydrocarbon block and each B prior to hydrogenation is predominantly a polymerized conjugated diene hydrocarbon block, to which has been grafted at least one ethylene oxide molecule, wherein substantially all of the grafted molecules are grafted to the block copolymer in the monoalkenyl aromatic or vinylarene block.

2. The functionalized block copolymer of claim 1 wherein the block copolymer is a styrene-ethylene/butylene-styrene block copolymer.

3. The block copolymer of claim 1 wherein prior to hydrogenation, the polymeric blocks A are polymer blocks of a monoalkenyl aromatic hydrocarbon.

4. The block copolymer of claim 1 wherein the blocks A comprise 1–40 percent by weight of the copolymer, the unsaturation of block B is reduced to less than 5% of its original value and the average unsaturation of the hydrogenated block copolymer is reduced to less than 20% of its original value.

5. The block copolymer of claim 4 wherein A is a polymerized styrene block having an average molecular weight of between about 500 and 60,000.

6. The block copolymer of claim 1 wherein B is a polymerized butadiene block having an average molecular weight of between about 35,000 and 150,000, 35%–50% of the condensed butadiene units having 1,2-configuration.

7. The block copolymer of claim 6 wherein the unsaturation of block B has been reduced by hydrogenation to less than 10% of its original value.

8. A functionalized selectively hydrogenated block copolymer composition according to claim 1 wherein an average of less than about 10% of the monoalkenyl aromatic hydrocarbon units are hydrogenated.

9. A functionalized hydrogenated block copolymer composition according to claim 1 wherein an average of more than about 25% of the monoalkenyl aromatic hydrocarbon units are hydrogenated.

10. The functionalized hydrogenated block copolymer of claim 1, wherein the grafted molecule or its derivative is present in said functionalized block copolymer at between about 0.02–20 weight percent.

11. The functionalized hydrogenated block copolymer of claim 1, wherein the grafted molecule or its derivative is present in said functionalized block copolymer at between about 0.1–10 weight percent.

12. The functionalized hydrogenated block copolymer of claim 1, wherein the grafted molecule or its derivative is present in said functionalized block copolymer at between 0.2–5 weight percent.

* * * * *